Nov. 9, 1948.  W. C. HOUSE  2,453,575
TONGUE ACTUATED BRAKE FOR HAND TRUCKS
Original Filed Nov. 2, 1943  2 Sheets-Sheet 1
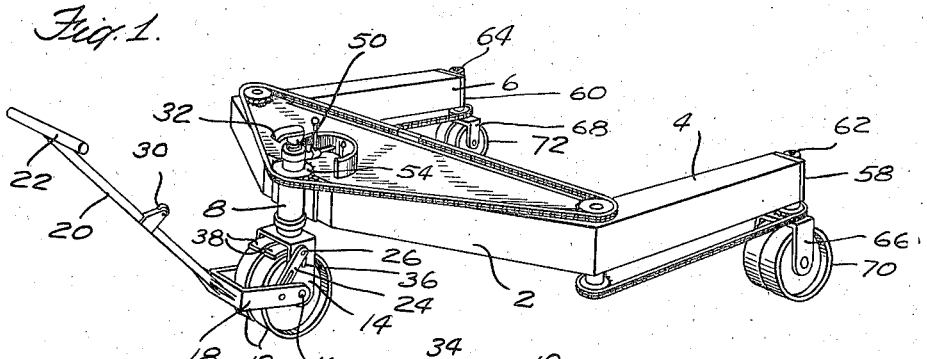
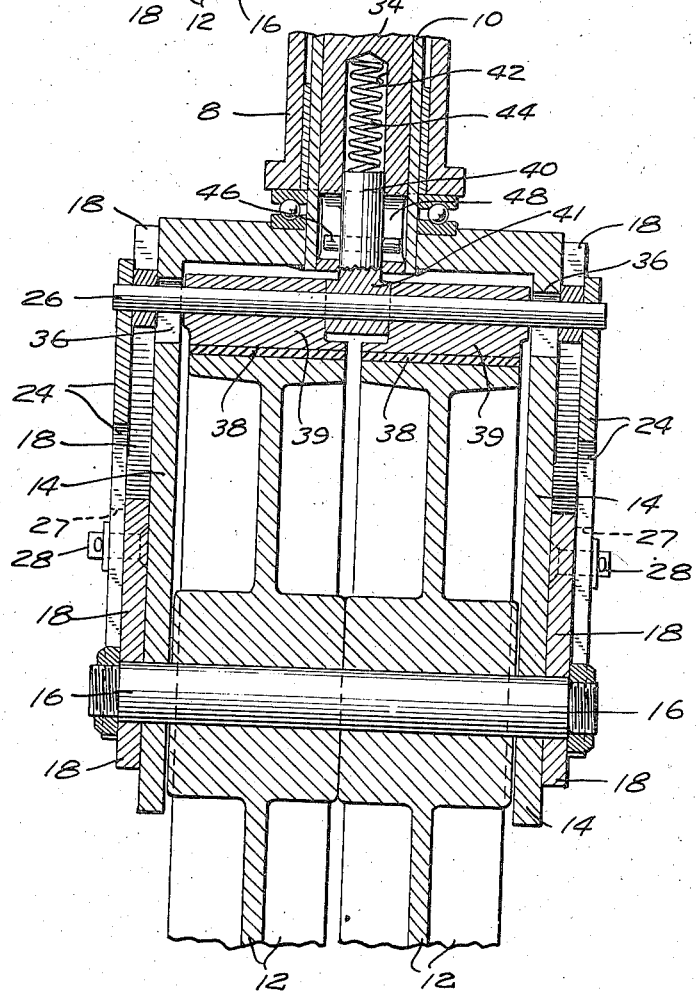
INVENTOR
WILLIAM C. HOUSE
BY
ATTORNEY

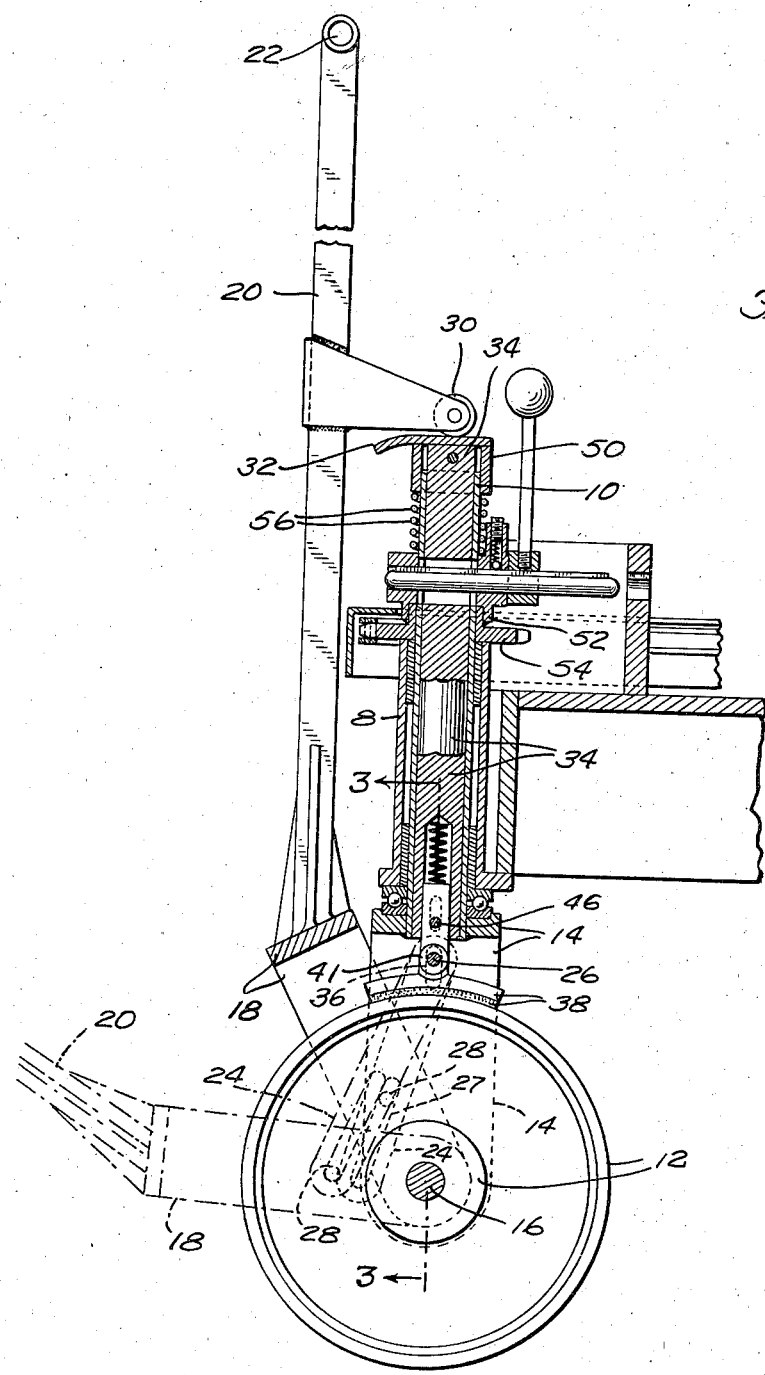

Patented Nov. 9, 1948

2,453,575

UNITED STATES PATENT OFFICE 2,453,575

TONGUE ACTUATED BRAKE FOR HAND TRUCKS

William C. House, Greene, N. Y., assignor to Lyon-Raymond Corporation, Greene, N. Y., a corporation of New York Original application November 2, 1943, Serial No. 508,711, now Patent No. 2,388,692, dated November 13, 1945. Divided and this application November 10, 1945, Serial No. 627,823

9 Claims. (Cl. 188—119)

This invention relates to manually steered and controlled trucks for handling materials, and particularly to braking means for such trucks which may be controlled by the combined steering and draft handles thereof.

Modern material handling trucks are usually of the so-called "lifting truck" type, that is, trucks which can be moved into lifting relation to a loaded portable platform, pallet or skid and operated to effect a mechanical lifting of the platform, pallet or skid preparatory to transportation thereof and which can be again operated to lower the platform, pallet or skid to deposit it in the desired new location. Although the present invention is particularly useful when applied to lifting trucks it will be understood that it is equally applicable to any manually drawn and steered truck.

When material handling trucks are used on other than level surfaces or when the drawn load acquires considerable momentum, it is desirable that means be provided to assist the operator in checking the movement of the truck or even to hold the truck in a definite location when the operator ceases to control its movements. To this end the present invention aims to provide improved braking means which can be operated from the steering and draft handle of the truck in any steering position thereof and which can also be operated to brake the movement of the truck or to hold it in a stationary position when the steering and draft handle of the truck is either in its upright position or in its lowered position.

An important feature of the invention is the provision of braking means which does not interfere with the ordinary steering and draft movements of the steering and draft handle but which is operable effectively to check the movement of the truck and any load carried thereby when said handle is moved either into its extreme upright position or into its extreme lowered position. It will be apparent that this construction and arrangement of the braking means is advantageous for checking the movement of a loaded truck which is moving down a grade, in that the operator can move the steering and draft handle into its upright position and closely control the movement of the truck, and that it is equally advantageous when he is pulling a load up a grade, since he can hold the handle in its normal draft position when exerting pull thereon and by merely lowering it slightly below the normal draft position can relieve the pull of the load on him by thus applying the brake.

Other objects, important features and advantages of the present invention, to which attention has not specifically been directed hereinabove, will appear hereinafter when the following description and claims are considered in connection with the accompanying drawings, in which—

Figure 1 is a perspective view of a truck having provision either for synchronous steering of all wheels or for steering by the front wheels alone and also embodying the present invention, the illustrated truck, there shown as provided with a superstructure permitting its use as a spotting dolly, being more fully shown and described in my copending application Serial No. 508,711, filed November 2, 1943, for Letters Patent for improvements in Lifting trucks, of which the present application is a division, said prior application having matured into U. S. Letters Patent No. 2,388,692, dated November 13, 1945;

Figure 2 is a vertical section through the steering head of the truck shown in Figure 1, illustrating the details of the brake and brake-operating mechanism, and Figure 3 is a section on the line 3—3 of Figure 2.

In the illustrative embodiment of the invention the truck frame or body proper, which is more fully described in my co-pending application and in the Letters Patent granted thereon hereinabove identified, has an open rear end and comprises the front body portion 2 and spaced side members 4 and 6, which may be formed of steel of rectangular open section as shown. Attached to the front part of the truck body in midposition is a vertical bearing 8 for the swivel stem 10 of the front wheel bearing support, this stem preferably being hollow for a purpose hereinafter described.

As herein shown, the bearing support for the front steering wheels 12 comprises a fork 14, welded or otherwise suitably connected to the stem 10 and receiving the bearing pin or shaft 16 for the wheels 12, this shaft preferably extending sufficiently beyond the sides of the fork 14 to receive a second fork 18 by which the combined draft and steering tongue 20, provided with a handle bar 22, is connected to the steering wheels 12. The steering fork 18 is connected by links 24 to a brake carrying shaft 26 extending across the fork 14 above the wheels 12 and projecting through slots 36 in the sides of the fork 14. Each link 24 has therein a slot 27 in which is received the shank of a headed pin 28 on a side arm of the fork 18. This slot 27 permits limited free vertical swinging movement of the steering handle 20, the closed lowered end of the slot 27, by engaging the pin 28, limiting the extent of the free downward movement of the handle 20. The slot 27 is preferably of sufficient length so that, when the tongue 20 is moved to its upright position, its cam-engaging roll 30 can be brought into operative brake-applying relation to the cam 32 on the upper end of a brake-applying rod or plunger 34 which is movable vertically to a limited extent in the hollow center of the swivel stem 10.

As herein shown, provision is made for applying the brake to the front steering wheels both when the combined draft and steering tongue 20 is moved into its upright position and when it is moved into its lowermost position. The application of the brake in the last mentioned position is made possible by providing the aforementioned slots 36 in the side arms of the fork 14 in which the brake-carrying shaft 26 may have a vertical brake-applying movement after the pins 28 on the fork 18 have reached the lower ends of the slots 27 in the links 24 so that further downward movement of the handle 20 exerts a downward pull on the links 24 and brake-carrying shaft 26. As shown in detail in Figure 3, brake shoes 38 for the respective wheels 12 have ears 39 by which they are pivoted on the cross pin or shaft 26 and this cross shaft 26 is in turn carried by a tubular support 41 welded to the lower end of a smaller plunger 40 arranged to move vertically in a socket 42 in the main brake-applying rod or plunger 34. The compression spring 44 tends to hold the smaller plunger 40 yieldingly at the lower limit of its movement in the socket 42, this movement being limited by a pin 46 carried by the plunger 40 and operating in diametrically opposed slots 48 in the side wall of the socket 42 in the brake-applying vertically movable rod or plunger 34.

It will be seen from an inspection of Figure 2 that a cap 50, having formed thereon the cam 32, is connected to the upper end of the main brake-applying rod or plunger 34 and that this cap is of sufficient diameter so that it can telescope over the upper end of the hollow swivel stem 10. Between the lower edge of the cap 50 and the upper end of a sleeve 52 which carries the driving sprocket 54 of the synchronous steering mechanism, more fully described in the application and Letters Patent hereinabove referred to, and which in turn rests upon the upper edge of the swivel stem bearing 8, is a spring 56 which is so tensioned that it tends to maintain the brake-applying rod or plunger 34 in its brake-releasing position.

It will thus be seen that when the steering handle 20 is in its upright position, shown in full lines in Figure 2 of the drawings, the brake will be applied by the engagement of the cam roll 30 on the steering handle or tongue 20 with the cam 32 on the upper end of the brake-applying rod or plunger 34, this engagement of the cam roll 30 with the cam 32 serving to depress the brake-applying rod sufficiently to bring the brake shoes 38 into engagement with the steering wheels 12. This application of the brake shoes will be spring pressed since the spring 44 and smaller telescoping plunger 40 intervene between the main brake-applying rod or plunger 34 and the brake. The compression of the spring 44 causes the pin 46 to travel up the slots 48 in the walls of the socket 42 after the brake shoes 38 have engaged the wheels 12, this compression of the spring 40 by the continued camming action of the cam roll 30 on the cam 32 serving to increase the braking effect.

When the combined draft and steering tongue or handle 20 is in the dotted line position shown in Figure 2, that is, when it has been depressed approximately to the lowest limit of its movement but is still in its draft position and not in its lower brake-applying position, the pins 28 being in engagement with the lower ends of the slots 27 in the links 24, further movement of the handle in the downward direction, by exerting a downward pull on the links 24, will cause the links 24 to pull down on the cross pin 26 carrying the brake shoes 38 and effect the application of the brake shoes 38 to the steering wheels 12. It will be seen that this downward pull is exerted against the tendency of the spring 56 to maintain the brake-applying rod or plunger 34 in its uppermost position. This is brought about by reason of the fact that the spring 44 in the socket 42 of the rod or plunger 34 tends to maintain the smaller telescoping plunger 40 at the lower limit of its movement in the socket 42, that is, with its pins 46 engaging the lower ends of the slots 48 in the main rod or plunger 34, and thus downward pull on the brake-supporting shaft 26 by the links 24 immediately exerts a downward pull on the brake rod or plunger 34 and thus tends to compress the spring 56. This brake-applying action, as distinguished from the brake-applying action when the tongue or handle 20 is in its upright position, will thus be seen to be a positive movement of the brake shoes 38 into engagement with the wheels 12. Preferably the combined weight of the tongue 20 and the handle bar 22 is such in respect to the normal brake releasing tension of the spring 56 that a mere dropping of the tongue 20 by the operator will produce an effective application of the brake.

At the rear ends of the side arms 4 and 6 of the truck shown in Figure 1 there are connected to the truck body bearings 58 and 60 for the swivel stems 62 and 64 of the bearing supports 66 and 68 of the rear supporting wheels 70 and 72 of the truck. As more fully set forth in the Letters Patent No. 2,388,692 hereinabove identified, these swivel stems 62 and 64 for the rear wheel bearing supports 66 and 68, mounted in the swivel bearings 58 and 60, instead of serving merely to permit the rear wheels 70 and 72 to caster, are so connected to the driving sprocket 54 that at no time can these wheels caster freely. Inasmuch as the connections which may be made between the swivel stems 62 and 64 for bearing supports for the rear supporting wheels 70 and 72 and the swivel stem 10 for the front steering wheels 12, to permit synchronous steering of all three sets of wheels if desired, and the arrangement by which the swivel stems 62 and 64 may be locked to the truck frame to maintain the rear wheels 70 and 72 in a fixed traveling relation to the truck frame while permitting the front steering wheels 12 to operate to steer the truck, constitute no part of the present invention, reference is had to the Letters Patent No. 2,388,692, hereinabove identified, for a complete description of these connections.

From the foregoing description it will be seen that the present invention provides simple and efficient means for braking the movements of a manually steered and controlled material handling truck by mere manipulation of the handle thereof and insures the application of an effective brake in either emergency position of the handle, that is, either when the load, tending to overtake the operator, causes the handle to be moved into its upright position or when, for any reason or cause, the operator drops the handle and it thus is carried by its own weight into its lowermost position. It will be understood that the invention is not restricted to the illustrative practicable embodiment thereof and that many variations of the specific embodiment shown can be made within the scope of the inventive idea as defined in the appended claims.

What I claim as new is:

1. In a truck, the combination with the truck frame, a swivelled steering wheel and a steering and draft tongue having a steering connection to said steering wheel swivel and pivoted to swing also in vertical planes between a substantially upright position and a position below draft level, of a brake for the steering wheel and means for operating said brake comprising a vertically slidable brake-depressing plunger extending through said steering wheel swivel, cooperating means carried by said plunger and said steering tongue respectively to effect a depression of said plunger to apply said brake when said steering tongue is moved into its upright position and other cooperating means carried by said plunger and said steering tongue respectively to effect a depression of said plunger to apply said brake when said steering tongue is moved into its position below draft level, said two plunger depressing means being independent of each other and both being inoperative between said approximately extreme tongue positions.

2. A truck according to claim 1 in which the brake mechanism comprises a brake shoe, a plunger by which said broke shoe is carried and which is vertically slidable in said steering wheel swivel, a spring yieldingly holding said brake in inoperative position and normally disengaged cooperating cam surfaces on said plunger and tongue which act to depress and positively lock said plunger with said brake in engagement with the front wheel when the tongue is swung into upright position.

3. A truck according to claim 1 in which the means carried by the plunger and the steering tongue to effect depression of the plunger to apply the brake when the tongue is moved into its position below draft level comprise links having a positive connection to one of said parts and a lost motion connection to the other part.

4. A truck according to claim 1 in which a compressible spring is interposed in the connection between the plunger and the brake.

5. A truck according to claim 1 in which the connection between the plunger and the wheel-engaging brake comprises a second plunger having limited telescopic movement in respect to the main plunger, a compressible spring being interposed between said plungers to maintain them yieldingly in extended relation.

6. A truck according to claim 1 in which the cooperating means for applying the brake, when the tongue is moved to its position below draft level, produce a positive application of said brake and in which the other brake applying means operate through an interposed spring.

7. In a truck, the combination with the truck frame, a swivelled steering wheel and a steering and draft tongue having a steering connection to said steering wheel swivel and pivoted to swing also in vertical planes between a substantially upright position and a position below draft lever, of a brake for the steering wheel and means for operating said brake comprising a vertically slidable brake depressing plunger extending through said steering wheel swivel and cooperating means carried by said plunger and by said steering tongue respectively to effect a depression of said plunger to apply said brake both when said steering tongue is moved into its upright position and also when said tongue is moved into its position below draft level, a second plunger carried by the brake depressing plunger in telescoping relation thereto interposed between the main plunger and the brake and a compressible spring arranged to maintain said second plunger in extended relation to the main plunger.

8. In a truck, the combination with the truck frame, a swivelled steering wheel and a steering and draft tongue having a steering connection to said steering wheel swivel and pivoted to swing also in vertical planes between a substantially upright position and a position below draft level, of a brake for the steering wheel and means for operating said brake comprising a vertically slidable brake depressing plunger extending through said steering wheel swivel and cooperating means carried by said plunger and by said steering tongue respectively to effect a depression of said plunger to apply said brake both when said steering tongue is moved into its upright position and also when said tongue is moved into its position below draft level, a second brake carrying plunger carried by the brake-depressing plunger in telescoping relation thereto, and a spring interposed between said plungers and tending to maintain them in extended relation to each other and stop means to limit said extended relation.

9. In a truck, the combination with the truck frame, a swivelled steering wheel and a steering and draft tongue having a steering connection to said steering wheel swivel and pivoted to swing also in vertical planes between a substantially upright position and a position below draft level, of a brake for the steering wheel and means for operating said brake comprising a vertically slidable brake-depressing plunger extending through said steering wheel swivel and resiliently maintained in brake-releasing position, means carried by said tongue for engaging the upper end of said plunger and depressing it to apply the brake when said plunger moves into its upright position and other means carried by said tongue for engaging and exerting a positive downward pull on said plunger when said tongue moves into its position below draft level, said tongue having depressing connection to said plunger only at the approximately extreme positions thereof.

WILLIAM C. HOUSE.

REFERENCES CITED

The following references are of record in the file of this patent:

UNITED STATES PATENTS

| Number | Name | Date |
|---|---|---|
| 1,273,692 | Tucker | July 23, 1918 |
| 1,766,104 | Coates | June 24, 1930 |